United States Patent
Holmes

[15] 3,667,374
[45] June 6, 1972

[54] DEEP FAT FRYER APPARATUS
[72] Inventor: Brandon M. Holmes, Nashville, Tenn.
[73] Assignee: Progressive Products Corporation, Nashville, Tenn.
[22] Filed: Oct. 14, 1970
[21] Appl. No.: 80,736

[52] U.S. Cl..................................99/408, 99/411, 210/167
[51] Int. Cl. ........................................................A47j 37/12
[58] Field of Search................210/DIG. 8, 167; 99/330, 336, 99/408, 411

[56] References Cited

UNITED STATES PATENTS

| | | | |
|---|---|---|---|
| 3,398,673 | 8/1968 | Koplock | 99/408 |
| 3,107,601 | 10/1963 | Longmire | 99/408 X |
| 3,225,681 | 12/1965 | Wells | 99/336 |
| 2,243,661 | 5/1941 | Tota | 99/330 |
| 3,477,361 | 11/1969 | Bradshaw | 99/408 |
| 3,415,181 | 12/1968 | Hart | 99/408 |
| 3,573,861 | 4/1971 | Lecrone | 99/408 X |
| 2,698,092 | 12/1954 | Morton | 99/408 X |
| 2,287,396 | 6/1942 | Roth | 99/408 X |
| 2,578,129 | 12/1951 | Daugherty | 99/408 |
| 2,652,767 | 9/1953 | Childs | 99/408 |

*Primary Examiner*—Billy J. Wilhite
*Attorney*—A. Yates Dowell and A. Yates Dowell, Jr.

[57] ABSTRACT

A deep fat fryer having a pump for circulating cooking fluid or oil in a cooking receptacle and a filter for removing foreign substances from the cooking oil. Cooking fluid circulated through the receptacle flow over the heating elements and sweeps along foreign particles in the fluid which are removed by a filter interposed in the flow path of the cooking fluid.

6 Claims, 7 Drawing Figures

INVENTOR
BRANDON M. HOLMES

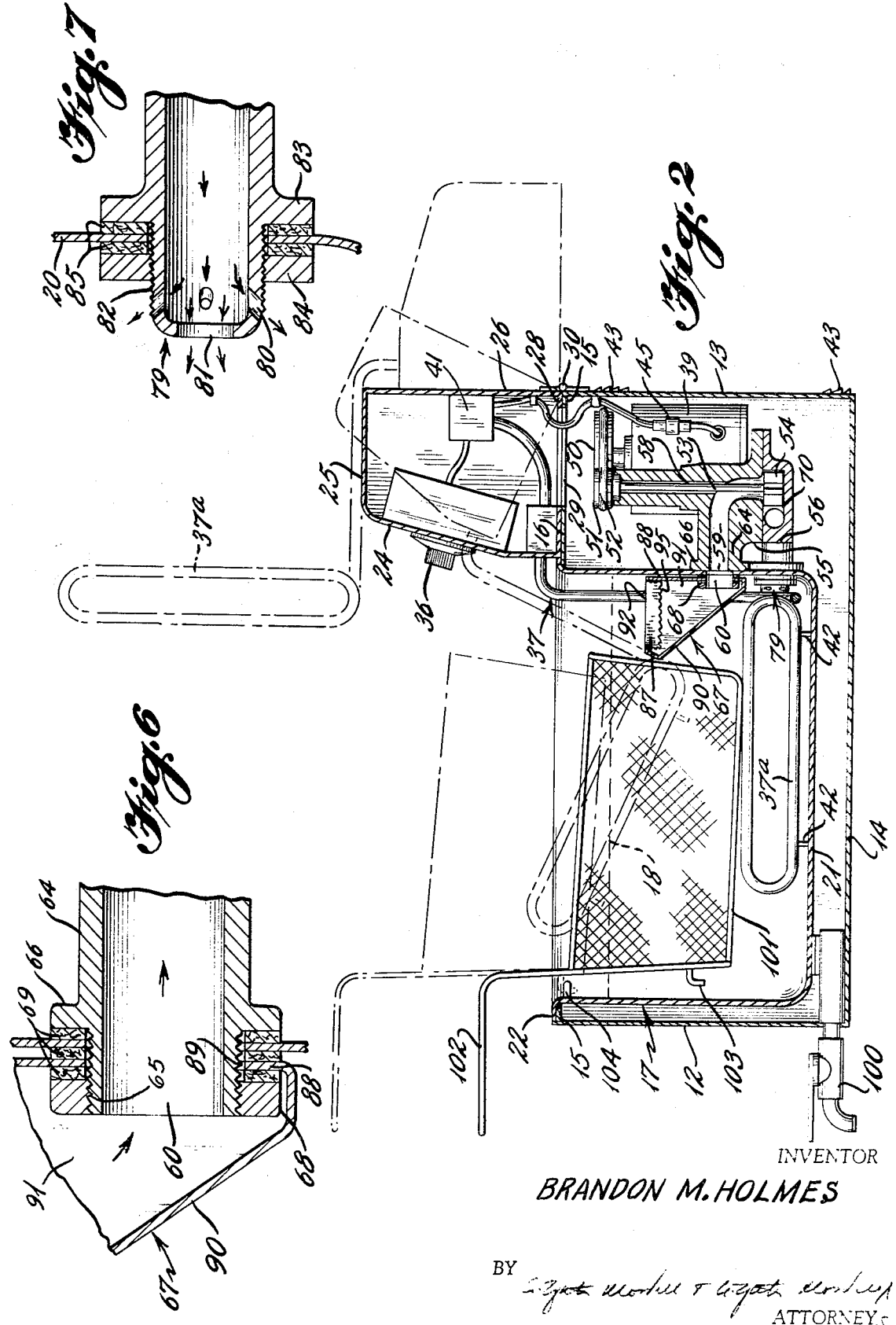

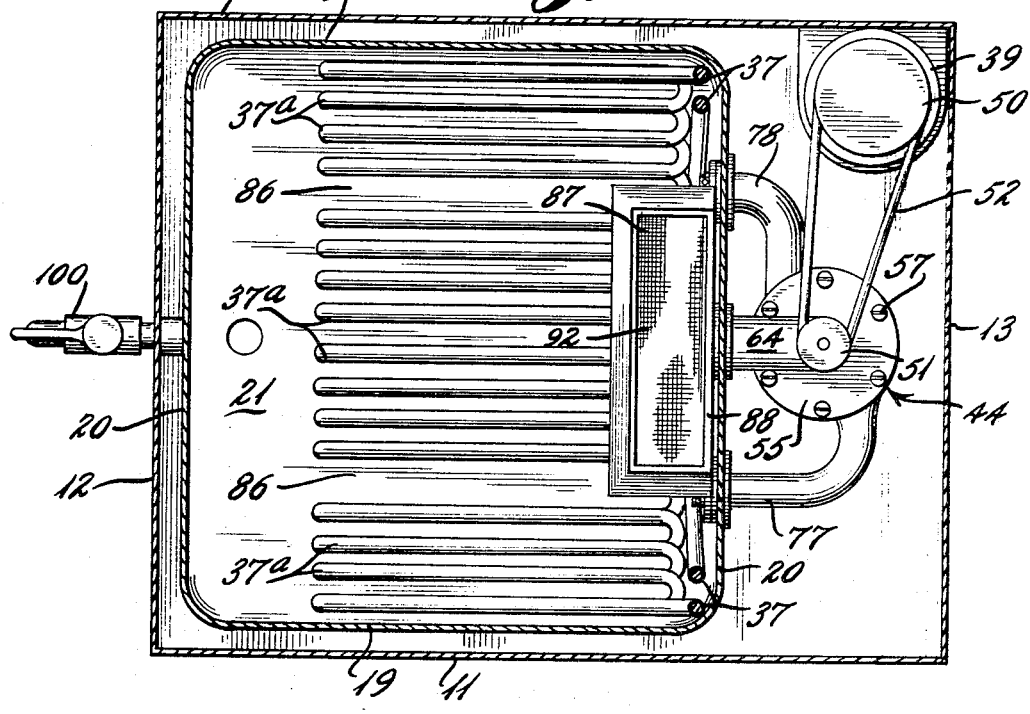
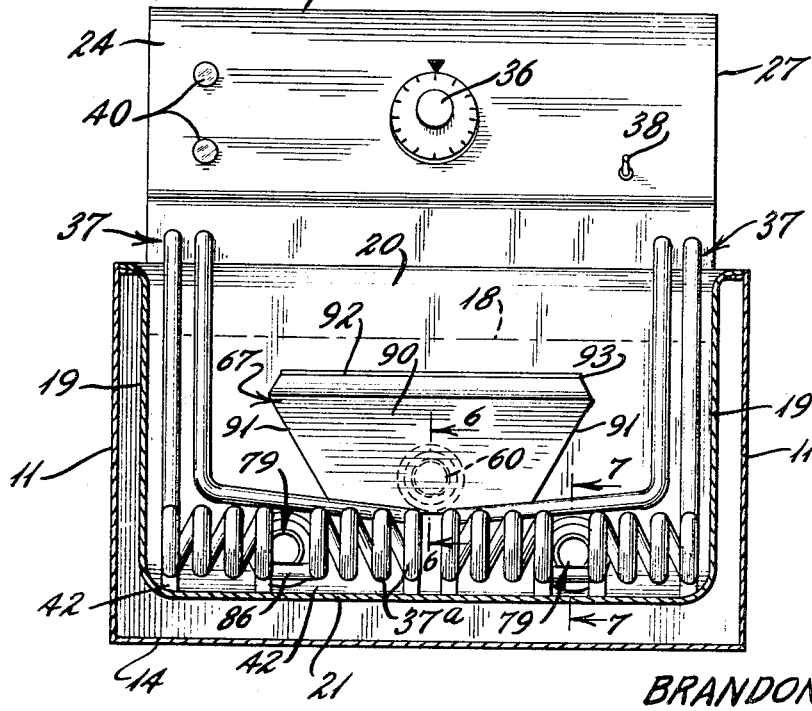

DEEP FAT FRYER APPARATUS

BACKGROUND OF THE INVENTION

1. Field of the Invention

This application relates generally to apparatus for deep fat frying of foods and relates particularly to apparatus for forced circulation of cooking fluid in a heated cooking receptacle and removal of foreign particles from the cooking fluid by filtration.

2. Description of the Prior Art

In the past, many efforts have been made to circulate cooking oil and filter it; however, these devices have been complicated, expensive to manufacture and maintain, and not fully effective. Some have provided elaborate filter systems located in piping separate from the cooking receptacle itself. Others have attempted to filter the cooking fluid as it leaves the cooking receptacle, but have located the filters in the bottom of the cooking receptacle so that the cooking fluid moves downwardly through the cooking chamber and would not be heated properly by heating elements located in the bottom of the cooking receptacle. Many devices indicate use of pumps to force flow of cooking fluid through a cooking receptacle but these do not direct the flow to permit maximum heat exchange with heating units in the cooking receptacle.

SUMMARY OF THE INVENTION

The present invention is an apparatus for deep fat frying which circulates cooking fluid through a cooking receptacle so as to maximize heat exchange between heating elements located within the cooking receptacle yet inhibit burning of the cooking fluid by eliminating prolonged static contact of the cooking fluid with the heating elements. Provision is also made for taking advantage of the circulation of the cooking fluid to filter out foreign particles such as pieces of food which become mixed with the cooking fluid. Cooking fluid is forcefully discharged by a pump along the bottom of a cooking receptacle and through heating elements located in the discharge path. The cooking fluid then flows upwardly and rearwardly to a point above the point of original entry where the cooking fluid is filtered and recycled through the pump.

It is an object of this invention to maximize the useful life of the cooking fluid and efficient heat exchange with heating elements by circulating cooking fluid through the heating elements and continuously cleaning the cooking fluid by means of a filter.

BRIEF DESCRIPTION OF THE DRAWINGS

FIG. 2 is a vertical sectional view taken on the line 2—2 of FIG. 1 looking in the direction of the arrows.

FIG. 3 is a horizontal sectional view taken on the line 3—3 of FIG. 1 looking in the direction of the arrows.

FIG. 4 is a transverse sectional view taken on the line 4—4 of FIG. 1.

FIG. 6 is a detail sectional view on an enlarged scale of the inlet to the circulating pump from the cooking vessel.

FIG. 7 is a detail sectional view comparable to FIG. 6 and on a similarly enlarged scale, illustrating the discharge conduit from the circulating pump and its connection to the cooking vessel.

Figure 1:
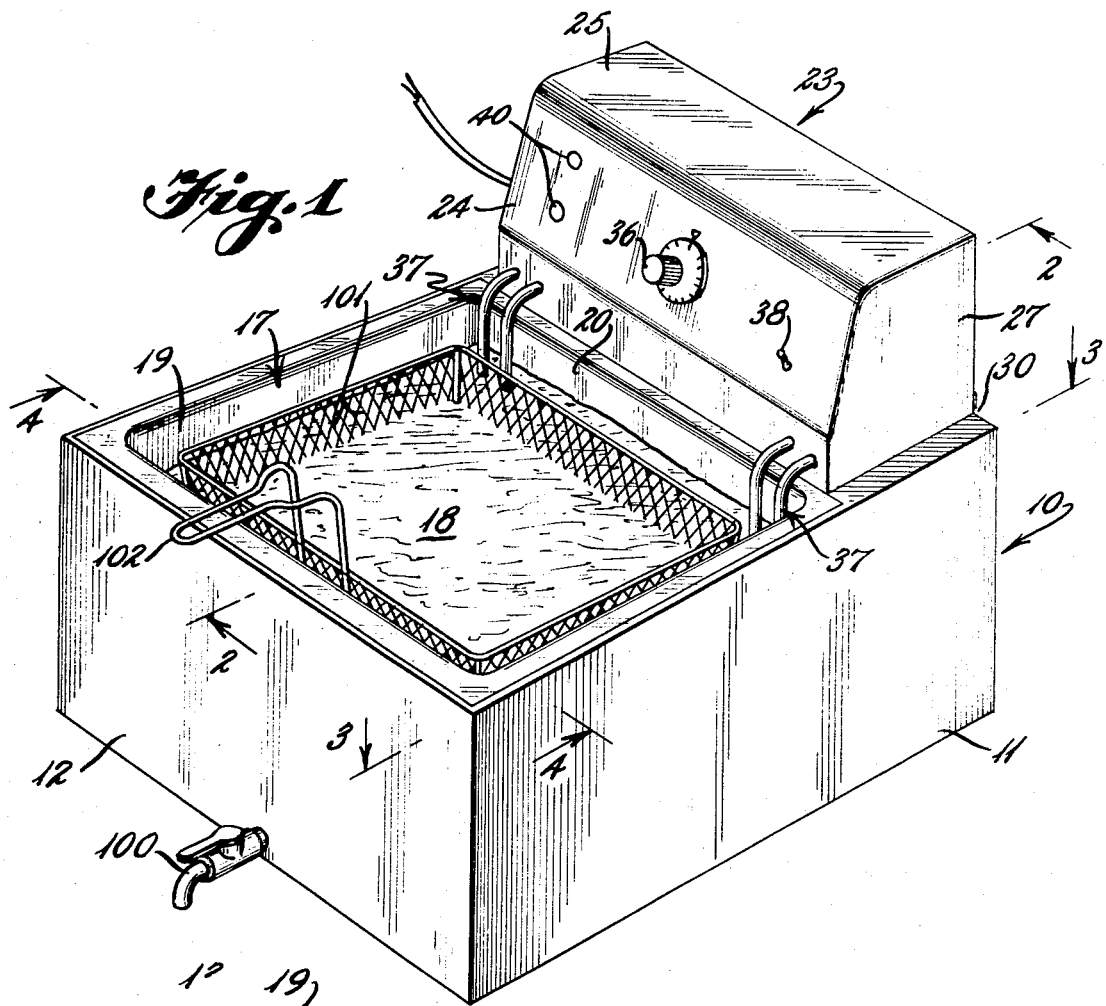
FIG. 1 is a perspective view of a deep fat fryer constructed in accordance with the present invention.
Figure 5:
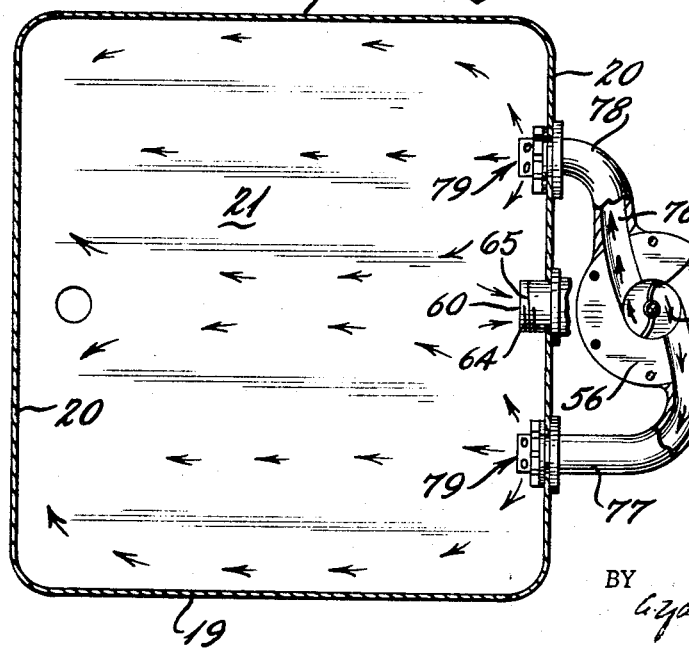
FIG. 5 is a detail sectional view through the cooking vessel illustrating the circulating pump and indicating the path of travel of the cooking or heat-transferring media, parts being broken away for purposes of clarity.

As shown more particularly in FIGS. 1 and 2 of the drawings, the deep fat fryer of the present invention includes an open-top housing 10 constituted by side walls 11, front and rear walls 12 and 13, respectively, and a bottom wall or base portion 14. Desirably, the open upper extremity of the housing 10 is provided with an inwardly directed peripheral flange or rim 15. It will be noted that this rim is relatively narrow along the front wall 12 and the greater extent of the two side walls 11; however, immediately adjacent the rear wall 13 and extending transversely across the housing, this rim is substantially increased in width to provide a supporting flange 16 for the support of the control console.

A relatively deep basin 17, within which the cooking fluid or oil 18 is retained, is received within the housing 10 and this basin includes side walls 19, front and rear walls 20, and a bottom wall portion 21. Preferably, the open upper extremity of the basin 17 is provided with an outwardly directed peripheral flange 22, complementary to the supporting rim 15 of the housing 10 whereby the basin 17 rest upon and is supported securely by the flange 15 and the front edge of the control support 16. It will be noted that the construction is such that the walls of the basin 17 are spaced from the adjacent walls of the housing 10 to provide an air space therebetween and obviate excessive heat transfer from the heating cooking fluid to the walls of the housing.

The control console 23 is a box-like enclosure including a front wall or panel 24, inclined for purposes of convenience, a top wall portion 25, a rear wall 26, side walls 27, and a bottom wall portion 28. This bottom wall portion, which rests upon the control flange 16, is provided with a centrally located opening or slot 29 and the flange 16 is complementarily slotted, to permit ready passage therethrough of suitable electrical wiring or the like. For convenience of access to the interior of the control console as well as for ease of assembly, the control console 23 is attached to the housing 10 through utilization of a piano-type hinge 30 whereby the console may be swung or pivoted upwardly to provide access to the interior thereof or to the adjacent interior of the housing.

The electrical controls required are substantially conventional and well-known in this art; thus, no particularly detailed discussion thereof is believed necessary. Suffice it to say, in brief, that certain of these including a temperature control or thermostat 36 for the selective control of the electrical heating elements 37 (which may be of the tubular sheathed conductor type), an on-off switch 38 (which also controls a heating fluid pump motor 39 located within the housing 10), and on-off indicator lights 40. It will be noted that a pair of resistance heating elements 37 are provided and these extend from juncture boxes 41 located within the control console, through the front panel 24, and depend downwardly into the heating basin 17. Thus, the heating elements move or swing as a unit with the control console from the operative position shown in full lines in FIG. 2 of the drawings to the inoperative position shown in dotted lines. Each of the heating elements 37, to provide greater heating capacity, may include a plurality of spaced and substantially parallel convolutions 37a and, when in operating position, the lower stretches (or convolutions) 37a are supported in closely spaced relationship with respect to the bottom wall 21 of the heating basin upon insulating legs or spacers 42.

In the chamber or area defined by the rear wall 20 of the heating basin 16 and the rear wall 13 and adjacent side wall portions of the housing 10, this area being located immediately beneath the control console, the heating fluid control or circulating pump motor 39 is mounted and, desirably, this area is well-ventilated by a plurality of louvers 43 in the end wall 13 of the housing 10. A circulating pump 44, to provide for forced circulation of the cooking fluid or oil, is provided and, if desired, a disconnect plug 45 may be included in the electrical wiring leading to the motor 39.

The circulating pump preferably is of the pulley-driven type; thus, a pulley 50 is mounted upon the motor drive shaft and a companion pulley 51 is mounted upon one extremity of the shaft 53 of the pump 44, this shaft extending through the pump housing, the belt 52 engaging the pulleys 50 and 51. The pump rotor 54 is mounted upon the remote extremity of the pump shaft 53.

The fluid-circulating pump is of substantially conventional design and includes an upper portion 55 and a lower portion 56 maintained in assembled relationship in any desired manner as by bolts or the like 57. The upper portion of the pump housing is provided with a vertically disposed bore 58 within which the shaft 53 is received and a horizontally disposed tubular extension 64 which is externally threaded as indicated at 65 and extends through a suitable aperture provided in the rear wall 20 of the cooking basin 17. The tubular extension 64 of the pump housing is provided with an external peripheral flange 66 to limit the extent of entry into the cooking basin. Thus, the free extremity of the tubular extension 64 provides an inlet or intake 60 for cooking fluid or oil which is drawn or removed from the cooking basin 17 through the passageway 59 which is in direct communication with the pump rotor chamber.

As shown more particularly in FIG. 6 of the drawings a filter element 67 is mounted upon the inner extremity of the threaded portion 65 of the tubular extension 64 and a suitable nut or the like 68 is employed for mounting the pump housing and filter element or apparatus, which will be described more fully hereafter, upon the rear wall of the cooking basin and, to insure a fluid-tight connection, suitable gaskets 69 produced from Teflon or the like are provided as is well known in this and related arts.

The lower portion 56 of the pump housing includes the rotor chamber 70 which is in direct communication with opposed outlet or discharge passages 75 and 76 whereby cooking fluid or oil being recirculated by the pump 44 is returned to the cooking basin. The discharge passages 75 and 76 are formed, respectively, in conduits 77 and 78 each of which, as shown here particularly in FIG. 7 of the drawings, terminates in a discharge nozzle 79 having a plurality of angularly disposed spaced apertures 80 and receivable within a suitable aperture provided in the rear wall 20 of the cooking basin. The end wall of each nozzle includes a centrally axially located aperture 81 and the direction of flow of cooking fluid through these nozzles into the cooking basin has been indicated by the directional arrows to be found in FIG. 7 of the drawings.

Each nozzle portion 79 is exteriorly threaded as indicated at 82 and includes an annular flange 83 to limit the extent of entry into the cooking basin 17. A suitable nut or the like 84 is employed for securing each nozzle (and the associated lower portion or base of the pump housing) to the rear wall of the cooking basin and, to insure a fluid-tight connection, suitable gaskets 85, produced from Teflon or other appropriate compressible material, are employed.

The three-point mounting described hereabove for the circulating pump, with the pump intake on a level above that of the return nozzles, insures appropriate anchorage and guards against adverse vibratory influences under operative conditions. The central apertures 81 in the discharge nozzles direct cooking fluid or oil in a horizontal path directly across the cooking vessel and against the inner surface of the front wall, while the spaced and angularly disposed apertures 80 direct jets of cooking oil radially of each nozzle. This arrangement has been found to be particularly effective to insure complete circulation of cooking fluid or oil over the heating elements, thus enhancing heat exchange, and throughout the cooking basin, and will not permit the overheating or burning of the cooking fluid through prolonged contact with the heating elements. Further, simultaneously with such circulation, the bottom surface of the cooking basin is continuously swept by cooking fluid entering through the lowermost nozzle jets so that any food articles or other foreign material in the cooking fluid which might have a tendency to gravitate to the bottom of the cooking basin will be carried long with the circulating fluid to be captured in the filter at the pump intake.

Desirably the convolutions of the heating elements are arranged in spaced groups (see FIG. 3 of the drawings) with an open area 86 between adjacent groups and the location of the nozzles 79 in alignment with such open areas insures rapid and efficient sweeping action by the current of circulating cooking fluid.

A screen filter 87 for collecting food particles or other foreign matter from the cooking fluid or oil is mounted directly above the intake 60 leading to the circulating pump.

This screen filter comprises a horizontally disposed top closure for a substantially V-shaped filter housing 67 which is constituted by a rear wall portion 88, apertured as at 89 for the passage therethrough of the threaded portion 65 of the tubular intake on the pump housing, a rearwardly inclined front wall 90 and side walls 91. The filter element, or basket, 87 may constitute a peripheral frame 93 supporting a wire-mesh basket having side walls 94 and a bottom wall 95. Desirably the upper extremities of the front wall 90 and side walls 91 of the filter housing are inwardly inclined to provide an open upper extremity 92 within which the filter seats securely.

To permit drainage of the cooking fluid or oil from the cooking basin 17, for replacement of the fluid and/or cleaning of the device, a conventional drain faucet 100 is provided, this faucet having appropriate attachment to the bottom wall 21 of the cooking basin and projecting outwardly through the front wall 12 of the fryer housing. Additionally, if desired, the bottom wall of the cooking basin may be inclined angularly toward the faucet inlet to facilitate drainage.

A conventional mesh-type cooking basket 101 is provided, having an extending handle portion 102 with appropriate means for supporting the basket above the level of the cooking oil when not in use or when drainage or cooling of the cooked food is desired. One form of such supporting means has been illustrated as a hook-like finger 103 attached to the front wall of the cooking basket, adjacent the lower extremity thereof and receivable within an apertured bracket 104 which is attached to the interior surface of the front wall 20 of the cooking basin adjacent the upper extremity thereof. As shown in full lines in FIG. 2 of the drawings, the cooking basket will rest upon the convolutions 37a of the heating coils during the cooking operation or cycle; the inoperative or drainage position of the cooking basket, supported above the level of this cooking fluid, has been illustrated in dotted lines in this Figure of the drawings.

When operation of the deep fryer of the present invention is initiated and the cooking fluid is cold and inherently viscous, the pump will not have the same degree of efficiency in circulating the cooking fluid over the heating elements as would exist when the cooking fluid is warm. Therefore it is desirable that the thermostat or temperature control knob 36 be adjusted initially to a comparatively low setting to permit warming of the cooking fluid. This obviates any possibility of the initial scorching or overheating of the cooking fluid through static contact with the heating elements whereby the quality or flavor thereof will be affected adversely.

There has thus been described a particularly efficient deep fat fryer, with means for continuous circulation and automatic filtration of the cooking fluid, which may be manufactured with economy and will require a minimum of care and attention during operation. It will be obvious to those skilled in this art that various changes may be made without departing from the spirit and scope of the invention. Thus, the invention is not limited by that which is shown in the drawings and described in the specification and reference therefore is had to the claims for summaries of the essentials of the invention and novel features of construction for all of which protection is desired.

What is claimed is:

1. A deep fat fryer comprising a housing, an open top cooking basin mounted within said housing, said basin having side and bottom walls for receiving cooking fluid to a predetermined level, a heating element located within said basin and adjacent said bottom wall for heating the cooking fluid, pump means located adjacent to one of said side walls, a filter element in said basin and located below and adjacent to the predetermined level of the cooking fluid, the suction side of said pump means communicating with the interior of said filter element to draw cooking fluid therethrough and remove foreign material from the fluid, at least one discharge outlet from said pump means, said discharge outlet communicating with said cooking basin adjacent to said bottom wall and substantially in alignment with said heating element, and means for operating said pump means to circulate the cooking fluid, whereby said cooking fluid is circulated around said heating element and through said cooking basin while foreign material is removed from circulation by said filter element.

2. The structure of claim 1 including an electrical control console hingedly mounted on said housing, said heating element being connected to said console, and means on said console for controlling the temperature of said heating element, whereby swinging said console upwardly moves said heating element out of said basin to facilitate cleaning.

3. The structure of claim 1 in which said filter element includes an open top housing, and screen means disposed across said open top housing to remove foreign matter from said cooking fluid.

4. The structure of claim 1 including a nozzle on the end of said discharge outlet, said nozzle having an opening at one extremity to permit direct flow of cooking fluid from the pump into said basin, and a plurality of apertures adjacent to said extremity to provide angularly disposed jets of cooking fluid.

5. The structure of claim 1 in which said heating element includes a plurality of generally parallel convolutions disposed in spaced groups and said discharge outlet from said pump is disposed in alignment with the space between adjacent groups.

6. The structure of claim 1 including a pair of spaced discharge outlets adjacent to said bottom wall for returning cooking fluid from said pump means to said basin.

* * * * *